(12) United States Patent
Patel et al.

(10) Patent No.: US 9,445,326 B2
(45) Date of Patent: Sep. 13, 2016

(54) METHOD AND APPARATUS FOR IMPROVED USER EXPERIENCE IN WIRELESS COMMUNICATION TERMINALS

(71) Applicant: MBIT WIRELESS, INC., Newport Beach, CA (US)

(72) Inventors: Bhaskar Patel, San Clemente, CA (US); Sivakumar Govindassamy, San Diego, CA (US); Arumugam Govindswamy, Irvine, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 110 days.

(21) Appl. No.: 14/573,389

(22) Filed: Dec. 17, 2014

(65) Prior Publication Data

US 2015/0172990 A1 Jun. 18, 2015

Related U.S. Application Data

(60) Provisional application No. 61/917,172, filed on Dec. 17, 2013.

(51) Int. Cl.
*H04W 36/00* (2009.01)
(52) U.S. Cl.
CPC ..... *H04W 36/0083* (2013.01); *H04W 36/0061* (2013.01); *H04W 36/0072* (2013.01)
(58) Field of Classification Search
CPC ........... H04W 36/18; H04W 36/0061; H04W 36/165; H04W 36/0016; H04W 36/0055; H04W 36/0072; H04W 36/0083
USPC ......................................................... 370/332
See application file for complete search history.

(56) References Cited

U.S. PATENT DOCUMENTS

| | | | | |
|---|---|---|---|---|
| 8,861,427 | B2 * | 10/2014 | Naslund | 370/315 |
| 2009/0197555 | A1 * | 8/2009 | Lindoff | H04L 5/0007 455/226.2 |
| 2011/0217972 | A1 * | 9/2011 | Vukajlovic | H04B 17/24 455/423 |
| 2012/0289247 | A1 * | 11/2012 | Siomina | G01S 5/0205 455/456.1 |
| 2013/0100877 | A1 * | 4/2013 | Naslund | H04B 7/155 370/315 |
| 2013/0188624 | A1 * | 7/2013 | Lee | H04W 23/02 370/338 |
| 2013/0223267 | A1 * | 8/2013 | Jung | H04J 11/005 370/252 |
| 2013/0258995 | A1 * | 10/2013 | Skov | H04L 5/0037 370/329 |
| 2014/0051426 | A1 * | 2/2014 | Siomina | H04W 36/0088 455/422.1 |
| 2014/0171097 | A1 * | 6/2014 | Fischer | H04W 4/02 455/456.1 |

(Continued)

*Primary Examiner* — Chi H Pham
*Assistant Examiner* — Robert Lopata
(74) *Attorney, Agent, or Firm* — Lerner, David, Littenberg, Krumholz & Mentlik, LLP (57) ABSTRACT

In the 3GPP Long Term Evolution wireless communication system, when performing handovers, the client terminal is not required to know the Radio Frame Number of the target cell. While basic functionality of the LTE wireless communication system air interface can be maintained in the new serving cell after handover completion without knowing the Radio Frame Number of the new serving cell, it is not possible to immediately resume many other important functions of LTE wireless communication system air interface, such as CSI measurements and reporting, SRS transmission, and SPS. Such functions can only be resumed after the Radio Frame Number becomes known. Conventional methods acquire the Radio Frame Number after completion of the handover. This may delay the resumption of the CSI, SRS, and SPS functions. A method and apparatus are disclosed that enable the client terminal to resume the CSI, SRS, and SPS functions immediately after handover completion.

20 Claims, 8 Drawing Sheets

(56) References Cited

U.S. PATENT DOCUMENTS

| | | | | |
|---|---|---|---|---|
| 2015/0117394 A1* | 4/2015 | Wang | H04W 16/04 | 370/330 |
| 2015/0139113 A1* | 5/2015 | You | H04L 5/003 | 370/329 |
| 2015/0195841 A1* | 7/2015 | Lorca Hernando | H04W 72/082 | 370/329 |
| 2015/0341148 A1* | 11/2015 | Kazmi | H04L 5/0098 | 370/252 |
| 2015/0372779 A1* | 12/2015 | Lim | H04J 11/005 | 370/338 |
| 2015/0373596 A1* | 12/2015 | Yiu | H04W 40/244 | 370/332 |
| 2016/0073370 A1* | 3/2016 | Axmon | H04W 56/0015 | 370/350 |
| 2016/0135123 A1* | 5/2016 | Soldati | H04W 52/0206 | 370/311 |
| 2016/0142981 A1* | 5/2016 | Yi | H04J 11/0069 | 455/522 |

\* cited by examiner

METHOD AND APPARATUS FOR IMPROVED USER EXPERIENCE IN WIRELESS COMMUNICATION TERMINALS

CROSS-REFERENCE TO RELATED APPLICATIONS

This application claims the benefit of the filing date of U.S. Provisional Application No. 61/917,172, filed Dec. 17, 2013 and entitled "METHOD AND APPARATUS FOR IMPROVED USER EXPERIENCE IN WIRELESS COMMUNICATION TERMINALS," the entire disclosure of which is hereby expressly incorporated by reference herein.

BACKGROUND OF THE INVENTION

Figure 1:
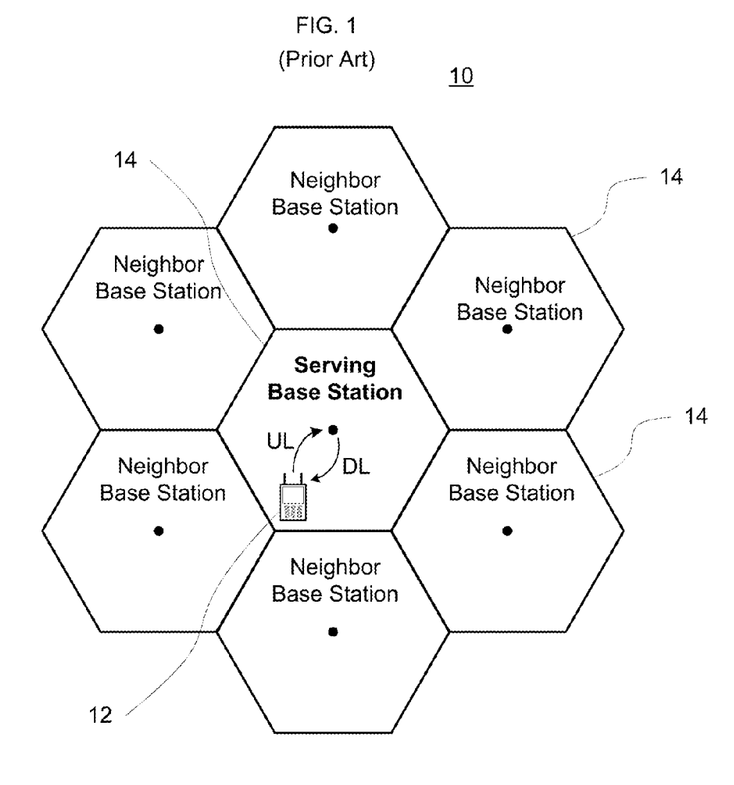
FIG. 1 illustrates a conventional mobile wireless communication system.

As shown in FIG. 1, a wireless communication system 10 comprises elements such as client terminal or mobile station 12 and base stations 14. Other network devices which may be employed, such as a mobile switching center, are not shown. In some wireless communication systems there may be only one base station and many client terminals while in some other communication systems such as cellular wireless communication systems there are multiple base stations and a large number of client terminals communicating with each base station.

As illustrated, the communication path from the base station (BS) to the client terminal direction is referred to herein as the downlink (DL) and the communication path from the client terminal to the base station direction is referred to herein as the uplink (UL). In some wireless communication systems the client terminal or mobile station (MS) communicates with the BS in both DL and UL directions. For instance, this is the case in cellular telephone systems. In other wireless communication systems the client terminal communicates with the base stations in only one direction, usually the DL. This may occur in applications such as paging.

The base station to which the client terminal is communicating with is referred as the serving base station. In some wireless communication systems the serving base station is normally referred as the serving cell. The terms base station and a cell may be used interchangeably herein. In general, the cells that are in the vicinity of the serving cell are called neighbor cells. Similarly, in some wireless communication systems a neighbor base station is normally referred as a neighbor cell. A neighbor cell that is a candidate for handover or reselection is referred as a target cell herein. Whenever a cell becomes a serving cell for a client terminal, that cell is referred as visited cell herein.

In the $3^{rd}$ Generation Partnership Project (3GPP) Long Term Evolution (LTE) wireless communication system, the air interface is organized into Orthogonal Frequency Division Multiplexing (OFDM) symbols, subframe and radio frames where each frame is identified by a Radio Frame Number (RFN). The RFN of a cell may be independent of the RFN of any other cell in the network. The 3GPP LTE wireless communication system air interface is specified such that when performing handovers the client terminal may not be required to know the RFN of the target cell. While the basic functionality of the LTE wireless communication system air interface can be maintained in the new serving cell after handover completion without knowing the RFN of the new serving cell, it is not possible to resume many other important functions of LTE wireless communication system air interface such as Channel State Information (CSI) measurements and reporting, Sounding Reference Signal (SRS) transmission, and the Semi-Persistent Scheduling (SPS), which require the knowledge of the RFN.

The CSI measurements and reporting from the client terminal to the base station, known as evolved NodeB (eNB) in 3GPP LTE wireless communication system, is essential for the eNB to assign resources to the client terminal in an optimum manner in the DL. Similarly, the SRS transmission from the client terminal to the eNB is essential for the eNB to assign resources to the client terminal in an optimum manner in the UL. The SPS is used for many real time services such a Voice over Internet Protocol (VoIP) and streaming services for music and video playback.

The CSI, SRS and SPS functions can only be resumed after the RFN becomes known, which is transmitted in the Physical Broadcast Channel (PBCH) of each cell. The PBCH decoding may require a minimum of 10 ms to a maximum of more than 100 ms depending on the prevailing signal conditions. In some cases, at the time of handovers the client terminal may be at the cell edge and the signal conditions may be generally poor. In such cases, the PBCH decoding at the time of handover may take longer time.

BRIEF SUMMARY OF THE INVENTION

To minimize interruption of important functions of an LTE wireless communication system air interface and to improve the user experience such as reduced interruptions in a call at the time of handover, stalled music or video playback, aspects of the invention are directed to start CSI, SRS, and SPS functions immediately after completing handover. To achieve this, the PBCH of the target neighbor cell must be decoded even before the handover is completed or initiated.

According to one aspect of the invention, a method of employing radio signal information in a receiver used in a wireless communication system having multiple cells is provided. The method comprises initiating, by one or more processors of the receiver, a cell search procedure detecting new cells and tracking already detected cells from one or more previous cell search procedures; performing, by the one or more processors, Reference Signal Received Power (RSRP) measurements for a serving cell and neighbor cells detected during the cell search procedure; selecting for further processing, by the one or more processors, any of the neighbor cells whose RSRP is within a first predetermined dB difference ($\Delta_1$) of the serving cell; determining, by the one or more processors, whether one or more of the selected neighbor cells' Physical Cell Identity (PCI) is the same as any previously visited cell; for the selected neighbor cells whose PCI is the same as any respective previously visited cell, the one or more processors using a previously decoded and tracked Radio Frame Number (RFN) corresponding to the respective previously visited cell; performing, by the one or more processors, Physical Broadcast Channel (PBCH) decoding for any remaining selected neighbor cells whose RFN is not yet known; stopping, by the one or more processors, the PBCH decoding for given ones of the neighbor cells that fall within a second predetermined dB difference ($\Delta_2$) below the serving cell RSRP after the given neighbor cells were previously selected for PBCH decoding; storing and tracking, by the one or more processors, the RFN and PCI for any ones of the neighbor cells that satisfy the selection criteria and whose PBCH decoding is successful; and using, by the one or more processors, the RFN and PCI information for the stored and tracked neighbor cells when a handover is completed to a new serving cell, wherein the RFN and PCI information is used to immediately resume, if enabled, one or more of a Channel State Information (CSI) function, an Sounding Reference Signal (SRS) function, and a Semi-Persistent Scheduling (SPS) function in the new serving cell after the handover.

In one example, the method further comprises omitting the PBCH decoding for the selected neighbor cells whose PCI is the same as a respective one of the previously visited cells.

In another example, the PBCH decoding for a target neighbor cell is initiated by the one or more processors while the receiver is still to the serving cell. Here, the PBCH decoding may be initiated according to the RSRP and according to Reference Signal Received Quality (RSRQ) metrics. In this case, the PBCH decoding of the remaining selected neighbor cells whose RFN is not yet known may be triggered by the RSRP and RSRQ metrics satisfying one or more configurable criteria. The one or more configurable criteria are that the neighbor cell RSRP and RSRQ metrics may be within a configurable threshold of the serving cell RSRP and RSRQ metrics.

In another example, the difference $\Delta_1$ between the serving cell RSRP and the neighbor cell RSRP is configured to be less than $\Delta_2$, and a first time instant where criteria for triggering the PBCH decoding is met after a second time instant for reporting measurements to a base station. In a further example, the PBCH decoding of the neighbor cells is performed concurrently with active data transfer with the serving cell. In yet another example, when the one or more processors estimate when a next handover will occur, stopping the PBCH decoding on all of the neighbor cells for a configurable period of time.

According to another example, when signal conditions improve for the serving cell after a first time instant, the PBCH decoding for the neighbor cells is stopped to reduce power consumption. In a further example, stopping the PBCH decoding for any of the neighbor cells is triggered according to a difference between the serving cell RSRP and each corresponding neighbor cell's RSRP. In this case, the difference between the serving cell RSRP and each corresponding neighbor cell's RSRP may be set to accommodate hysteresis, thereby preventing one or more starts or stops in PBCH due to fluctuations in RSRP or RSRQ under fading conditions.

According to another example, once the one or more processors of the receiver decode the RFN of a particular cell, one or more relative offsets between the service cell and the neighbor cells are maintained by the receiver for a configurable amount of time. Here, the one or more relative offsets may be maintained for multiple neighbor cells. Alternatively, the one or more offsets are relative to an internal time reference of the receiver not tied to any particular serving cell.

In yet another example, when the one or more processors of the receiver perform reselection or handover to a particular cell with previously detected PCI within a configurable time period $T_{revisit}$, then the PCI is considered to refer to the particular cell with the same Global Cell Identity (GCI). In this case, the configurable time period $T_{revisit}$ may be dynamically adjusted based on one or more factors derived from a number of reselections or handovers in a certain period of time. Alternatively, a counter for the configurable time period $T_{revisit}$ is maintained separately for each neighbor cell.

According to another aspect of the invention, a receiver device for use in a wireless communication apparatus is provided. The receiver device comprises means for receiving signals from multiple cells in a wireless communication system, and one or more processing devices operatively coupled to the receiving means. The one or more processing devices are configured to initiate a cell search procedure detecting new cells and tracking already detected cells from one or more previous cell search procedures, perform Reference Signal Received Power (RSRP) measurements for a serving cell and neighbor cells detected during the cell search procedure, select, for further processing, any of the neighbor cells whose RSRP is within a first predetermined dB difference ($\Delta_1$) of the serving cell and determine whether one or more of the selected neighbor cells' Physical Cell Identity (PCI) is the same as any previously visited cell. For the selected neighbor cells whose PCI is the same as any respective previously visited cell, the processing devices are further configured to use a previously decoded and tracked Radio Frame Number (RFN) corresponding to the respective previously visited cell. The processing devices are also configured to perform Physical Broadcast Channel (PBCH) decoding for any remaining selected neighbor cells whose RFN is not yet known, stop the PBCH decoding for given ones of the neighbor cells that fall within a second predetermined dB difference ($\Delta_2$) below the serving cell RSRP after the given neighbor cells were previously selected for PBCH decoding, store and track the RFN and PCI for any ones of the neighbor cells that satisfy the selection criteria and whose PBCH decoding is successful, and use the RFN and PCI information for the stored and tracked neighbor cells when a handover is completed to a new serving cell. The RFN and PCI information is used to immediately resume, if enabled, one or more of a Channel State Information (CSI) function, an Sounding Reference Signal (SRS) function, and a Semi-Persistent Scheduling (SPS) function in the new serving cell after the handover.

And according to a further aspect of the invention, a non-transitory recording medium is provided. The recording medium stores instructions that, when executed by one or more processors, causing the one or more processors to execute a method of employing radio signal information in a receiver used in a wireless communication system having multiple cells. The method comprises initiating a cell search procedure detecting new cells and tracking already detected cells from one or more previous cell search procedures; performing Reference Signal Received Power (RSRP) measurements for a serving cell and neighbor cells detected during the cell search procedure; selecting, for further processing, any of the neighbor cells whose RSRP is within a first predetermined dB difference ($\Delta_1$) of the serving cell; determining whether one or more of the selected neighbor cells' Physical Cell Identity (PCI) is the same as any previously visited cell; for the selected neighbor cells whose PCI is the same as any respective previously visited cell, using a previously decoded and tracked Radio Frame Number (RFN) corresponding to the respective previously visited cell; performing Physical Broadcast Channel (PBCH) decoding for any remaining selected neighbor cells whose RFN is not yet known; stopping the PBCH decoding for given ones of the neighbor cells that fall within a second predetermined dB difference ($\Delta_2$) below the serving cell RSRP after the given neighbor cells were previously selected for PBCH decoding; storing and tracking the RFN and PCI for any ones of the neighbor cells that satisfy the selection criteria and whose PBCH decoding is successful; and using the RFN and PCI information for the stored and tracked neighbor cells when a handover is completed to a new serving cell, wherein the RFN and PCI information is used to immediately resume, if enabled, one or more of a Channel State Information (CSI) function, an Sounding Reference Signal (SRS) function, and a Semi-Persistent Scheduling (SPS) function in the new serving cell after the handover.

DETAILED DESCRIPTION

The foregoing aspects, features and advantages of the present invention will be further appreciated when considered with reference to the following description of exemplary embodiments and accompanying drawings, wherein like reference numerals represent like elements. In describing the exemplary embodiments of the invention illustrated in the appended drawings, specific terminology will be used for the sake of clarity. However, the invention is not intended to be limited to the specific terms used.

In a 3GPP LTE wireless communication system, the handover decisions are primarily, although not exclusively, based on the RSRP and Reference Signal Received Quality (RSRQ) measurement reports from client terminal to the base station. The client terminal first detects the cells using the cell search procedure and determines the Physical Cell Identity (PCI). The PCI is used to make the RSRP and RSRQ measurements on the detected cells at periodic intervals. Depending on the measurement configuration from the eNB, the client terminal may start reporting the measured RSRP and RSRQ for the neighbor cells that meet the reporting criteria. The reported RSRP and RSRQ metrics are a subset of the inputs to the eNB for making handover decisions.

Figure 2:
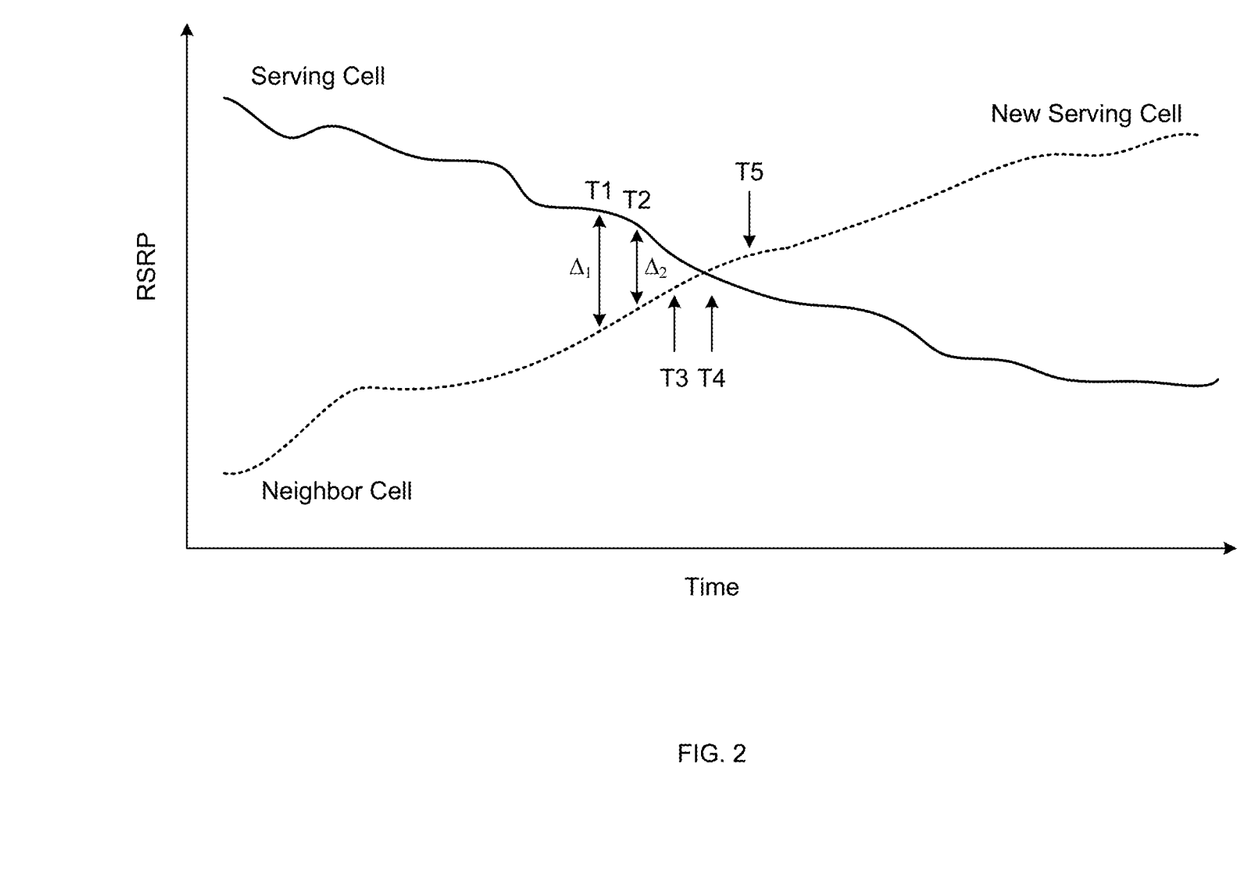
FIG. 2 illustrates the serving cell and neighbor cell Reference Signal Received Power (RSRP) and various event triggers and thresholds to start PBCH decoding according to aspect of the present invention.

According to an aspect of the present invention, the PBCH decoding of the target cell is initiated while the client terminal may be still connected to the current serving cell. According to an aspect of the present invention, the client terminal may initiate the PBCH decoding based on the RSRP and RSRQ metrics. According to another aspect of the invention, the trigger for neighbor cell PBCH decoding may be based on RSRP and RSRQ meeting certain configurable criteria. An example of the criteria may be that the neighbor cell RSRP and RSRQ metrics are within some configurable threshold of the serving cell RSRP and RSRQ. An example of the present invention is shown in FIG. 2 where the neighbor cell PBCH decoding is triggered when the difference between the serving cell RSRP and neighbor cell RSRP is $\Delta_1$ dB at time instant T1. The neighbor cell measurement reporting criteria may be met when the difference between the serving cell and neighbor cell RSRP is $\Delta_2$ dB at time instant T2. The actual handover decision by eNB may be triggered at time instant T3 and the handover may be completed at time instant T4. The CSI, SRS, and SPS functions may be resumed at time instant T4 if the PBCH decoding is performed according to the aspects of the present invention. Without the use of the present invention, the CSI, SRS, and SPS functions maybe resumed at a time instant later than T4 such as at time instant T5. This can degrade system performance. The actual gap between time instants T4 and T5 may vary depending on the signal conditions.

According to another aspect of the invention the difference $\Delta_1$ between the serving cell RSRP and neighbor cell RSRP may be configured such that it is less than $\Delta_2$ and the time instant where the criteria for triggering PBCH decoding is met may be after the time instant T2 for reporting the measurements to the eNB.

Note that the configurable thresholds are internal to the client terminal implementation for initiating the PBCH decoding for neighbor cell. On the other hand, the thresholds for reporting the RSRP and RSRQ to the eNB may be configured by eNB.

The exact neighbor cell to which the handover may be performed is not known to the client terminal a priori. However, the handover is often likely to occur with one of the neighbor cells whose RSRP and RSRQ are among the highest. According to another aspect of the present invention, the PBCH decoding may be performed for more than one of the neighbor cells that meet the criteria for performing PBCH decoding.

Figure 3:
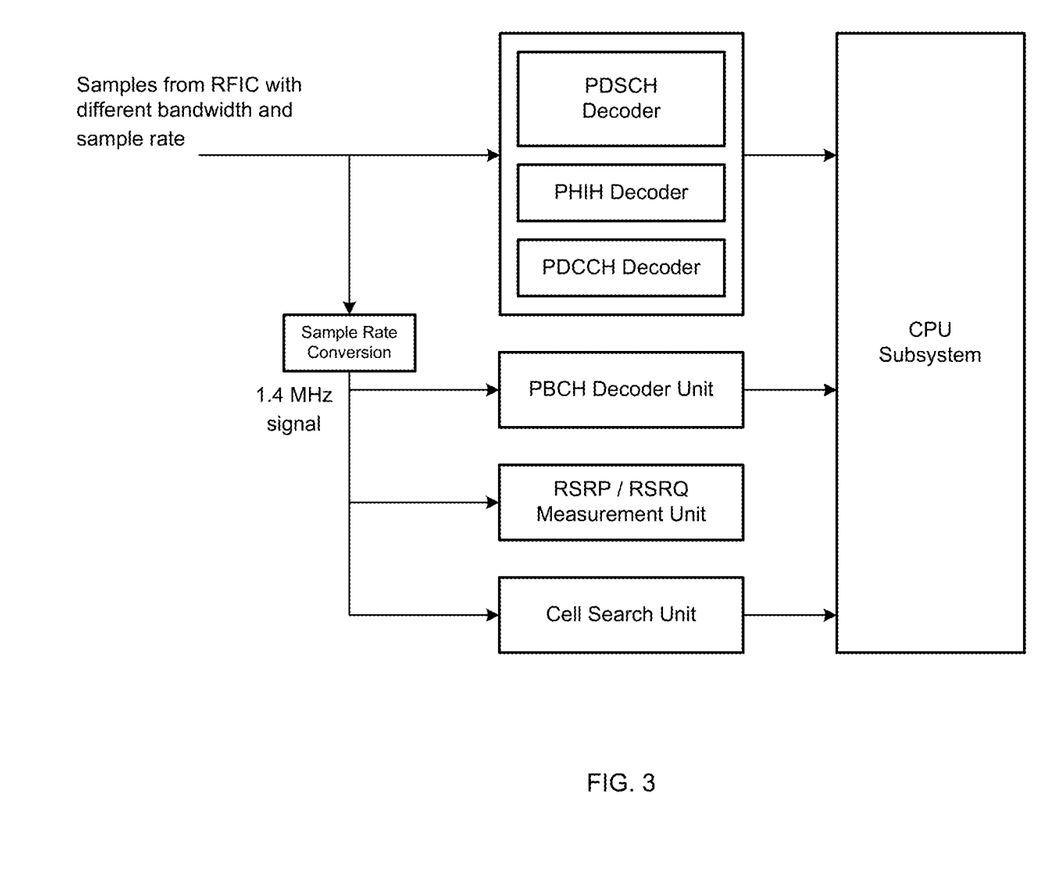
FIG. 3 illustrates a baseband modem that is configured to perform neighbor cell PBCH decoding in parallel to the normal serving cell receive operations according to the aspects of the present invention.

According to another aspect of the invention, the PBCH decoding of the neighbor cells may be performed while continuing the active data transfer with the serving cell as shown in FIG. 3. Since the LTE wireless communication system generally employs universal frequency reuse, the neighbor cells may use the same frequency as the serving cell. This allows the client terminal to perform neighbor cell PBCH decoding without interrupting the active data transfer with the current serving cell.

According to another aspect of the present invention, the client terminal may resume the CSI, SRS and SPS functions immediately after handover completion if those functions are configured in the new serving cell since the RFN of the target neighbor cell, which becomes the new serving cell after handover, is known.

According to another aspect of the invention, after handover completion, PBCH decoding on all the neighbor cells may be stopped for a certain configurable period of time since the next handover may happen after a certain minimum duration which the client terminal may know a priori based on information that may be received in the handover message or default configurations specified in the 3GPP LTE wireless communication system standard.

Figure 4:
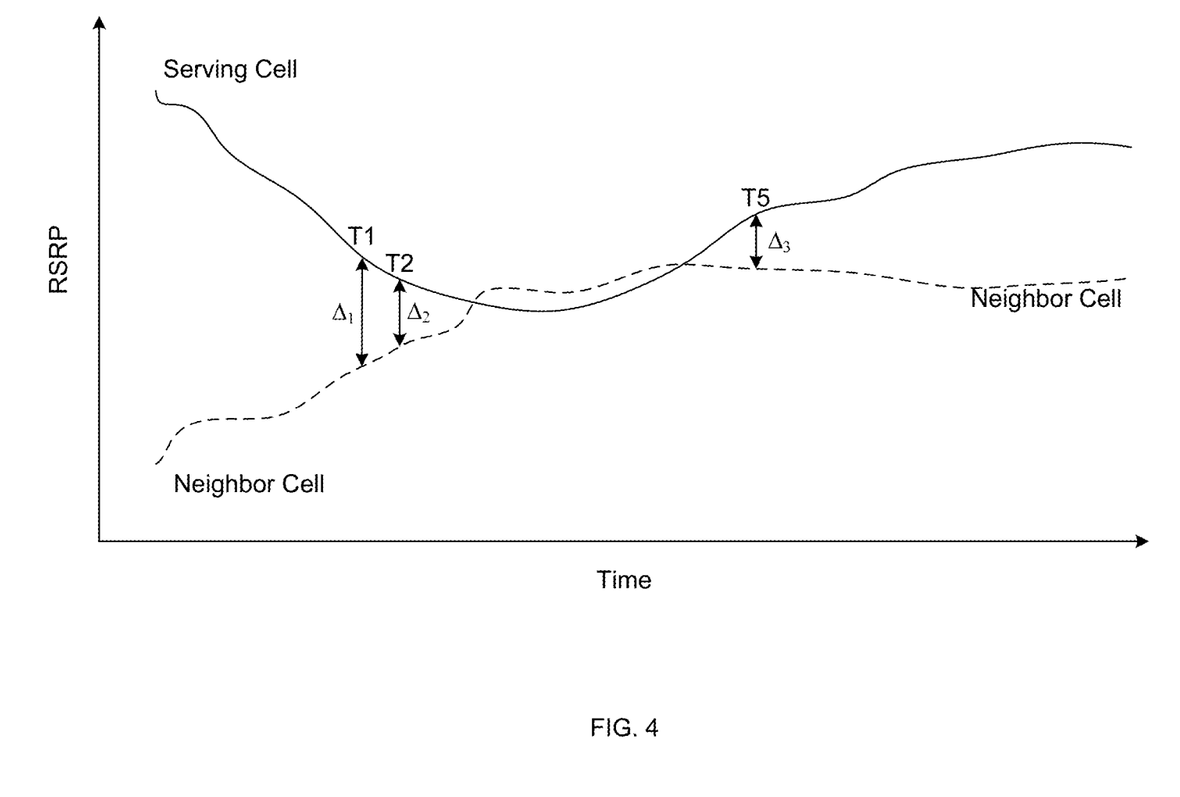
FIG. 4 illustrates the serving cell and neighbor cell RSRP and various event triggers and thresholds to stop PBCH decoding according to aspect of the present invention.

According to another aspect of the invention, if the signal conditions improve for the serving cell after time instant T1 as shown in FIG. 4, the PBCH decoding for the neighbor cells may be stopped to reduce power consumption. The trigger for stopping the neighbor cell PBCH may be based on the difference between the serving cell RSRP and neighbor cells RSRP. If the serving cell RSRP is higher than the neighbor cell RSRP by $\Delta_3$ dB, the PBCH decoding for that neighbor cell may be stopped. According to another aspect of the invention, the thresholds $\Delta_1$ and $\Delta_3$ may be different to allow for hysteresis which may prevent frequent starts and stops for PBCH decoding when there are small fluctuations in RSRP and RSRQ under fading conditions.

Some network deployments may use synchronized cells where the timing of all the cells relative to each other is fixed and may not change over time. According to another aspect of the invention, once the client terminal decodes the RFN of a particular cell, the relative offset between the serving cell and the neighbor cells is maintained by the client terminal for a certain configurable amount of time. This enables the client terminal to reuse the previously decoded RFN information. This may obviate the need for decoding the RFN again for a cell whose RFN was already decoded once before. Even if the RFN is not used directly for the CSI, SRS, and SPS functions, it may be used to expedite the PBCH decoding which may take longer without having a priori knowledge of the RFN for the cell whose RFN is being decoded. According to another aspect of the invention the RFN offsets may be maintained for multiple neighbor cells. According to another aspect of the invention, the offsets may be relative to a client terminal internal time reference not tied to any particular serving cell. This enables the RFN relative offsets to be usable even when the serving cell is changed after a handover.

In an LTE wireless communication system, two different identifiers are used to identify the cells efficiently and uniquely. The PCI is used for identifying a cell within a certain area and is only unique within that area. The Global Cell Identity (GCI) is used for identifying a cell uniquely within the entire network. The PCI may be reused in a wireless communication network for cells that are sufficiently far apart geographically from each other. The GCI may never be reused in a given network. The RSRP and RSRQ measurements and PBCH decoding only require the PCI of a cell. A previously detected cell with a given PCI and a newly detected cell with the same PCI may not necessarily refer to the same cell, i.e., they may have different GCI. The RFN of a cell with the same PCI but different GCI may not be related from client terminal perspective. According to an aspect of the present invention, if the client terminal does reselection or handover to a cell with previously detected PCI within configurable time period $T_{revisit}$, then the PCI may be considered to refer to the same cell with the same GCI. In this case, the previously decoded and tracked RFN may be used. If the client terminal does reselection or handover to a cell with previously detected PCI beyond the configurable time period $T_{revisit}$, then the PCI may be considered to refer to a different cell and PBCH decoding may be triggered for that new cell. According to another aspect of the invention, the configurable time period $T_{revisit}$ may be dynamically adjusted based on other factors such as the degree of mobility of the client terminal which may be derived from the number of reselections or handovers in a certain period of time. According to another aspect of the invention, the counter for time period $T_{revisit}$ may be maintained separately for each neighbor cell. Furthermore, the counter for time period $T_{revisit}$ may be restarted whenever a resection or handover is performed to a cell for which the time period $T_{revisit}$ counter may already be running. This enables the client terminal to avoid having to decode the PBCH for cells whose PBCH may be already decoded before.

Figure 5:
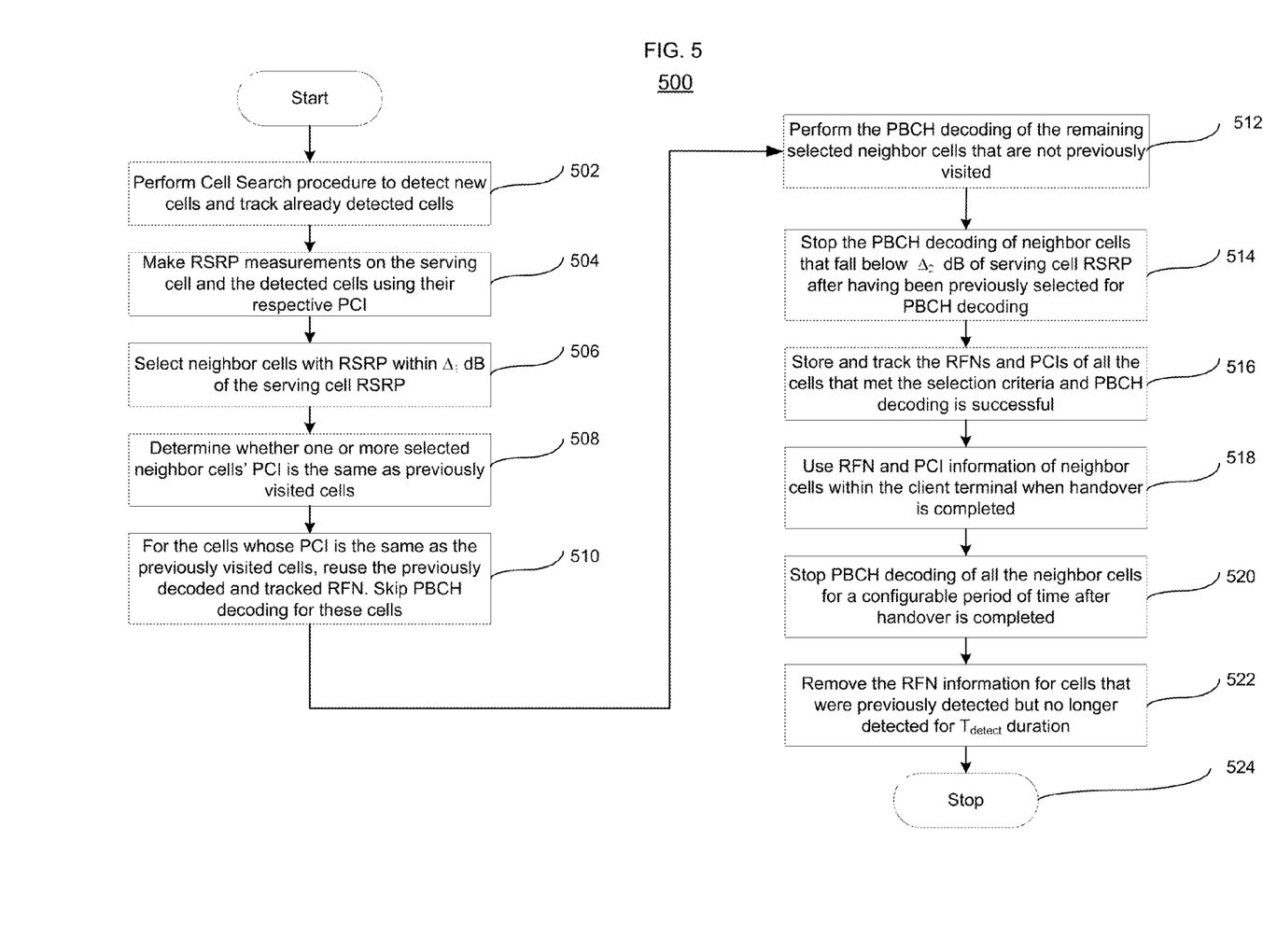
FIG. 5 illustrates an example flow diagram for processing steps according to aspects of the present invention.

The flow diagram 500 contained in FIG. 5 illustrates an exemplary RFN determination method according to various aspects of the present invention. The processing relevant to the present invention begins in processing stage 502 where the cell search procedure is triggered to detect new cells and track already detected cells from previous cell search procedures. At the next processing stage 504, the RSRP measurements are performed for the serving cell and the neighbor cells detected during cell search procedure. At processing stage 506, the RSRP measurements are analyzed and the neighbor cells whose RSRP is within $\Delta_1$ dB of the serving cell are selected for further processing. At processing stage 508, a determination is made whether one or more selected neighbor cells' PCI is the same as previously visited cells. At processing stage 510, for the cells whose PCI is the same as the previously visited cells, the previously decoded and tracked RFN is used. The PBCH decoding for these cells may be skipped. At processing stage 512, the PBCH decoding is performed for the remaining selected cells whose RFN is not yet known. At processing stage 514, the PBCH decoding for cells that fall $\Delta_2$ dB below the serving cell RSRP is stopped after the cells were previously selected for PBCH decoding. At processing stage 516, the RFN and PCI are stored and tracked for cells that meet the selection criteria and whose PBCH decoding is successful. At processing stage 518, the RFN and PCI information for the neighbor cells is used within the client terminal when the handover is completed. This information may be used to resume the CSI, SRS, and SPS functions in the new serving cell after the handover. At processing stage 520, after the handover is completed the PBCH decoding for all neighbor cells may be stopped for a configurable period of time. At processing stage 522, the RFN and PCI information is removed for cells that were previously detected but are no longer detected for the configurable duration $T_{detect}$. The processing terminates at stage 524. The processing in the flow diagram 500 may be repeated on a periodic basis.

By way of example only, the above-described method may be implemented in a receiver, e.g., a user device such as a wireless mobile station (MS) 12 as shown in FIG. 1.

Figure 6:
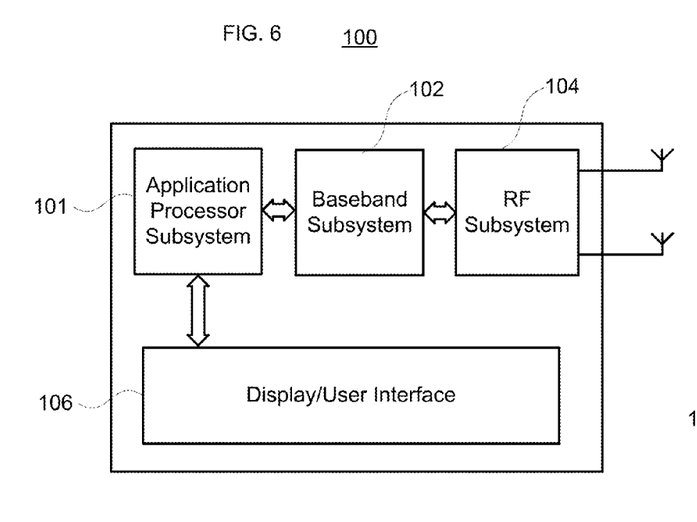
FIG. 6 illustrates a wireless mobile station diagram, which may be employed with aspects of the invention described herein.

As shown in FIG. 6, MS 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 are all integrated as one integrated chip.

Figure 7:
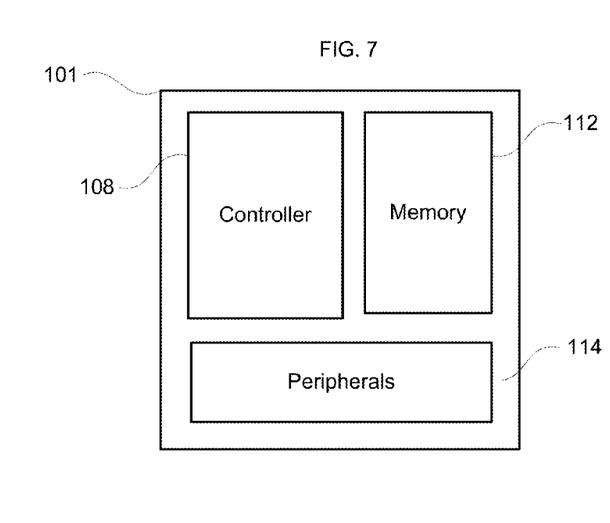
FIG. 7 illustrates an application processor subsystem for a wireless mobile station, which may be employed with aspects of the invention described herein.
Figure 8:
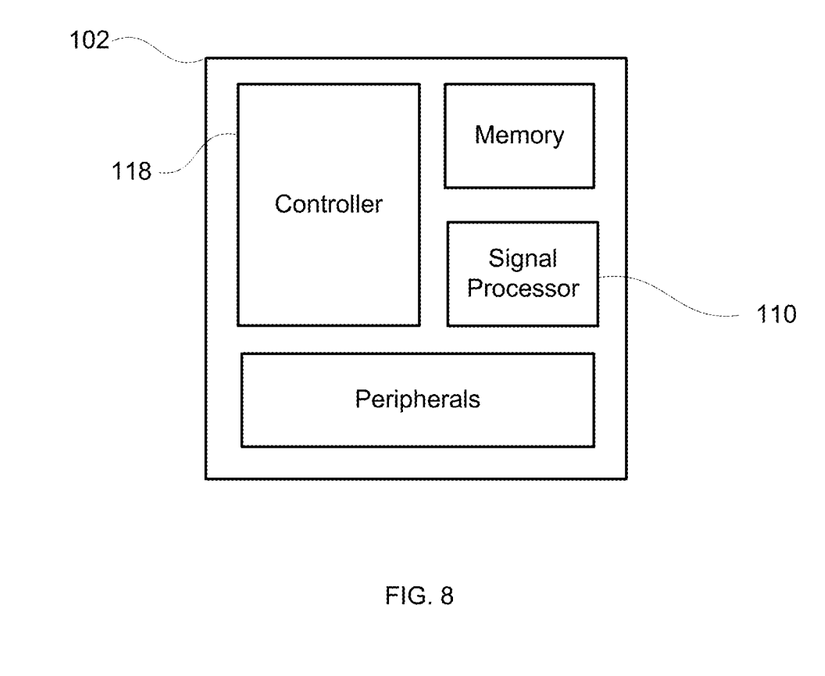
FIG. 8 illustrates a baseband subsystem for a wireless mobile station, which may be employed with aspects of the invention described herein.
Figure 9:
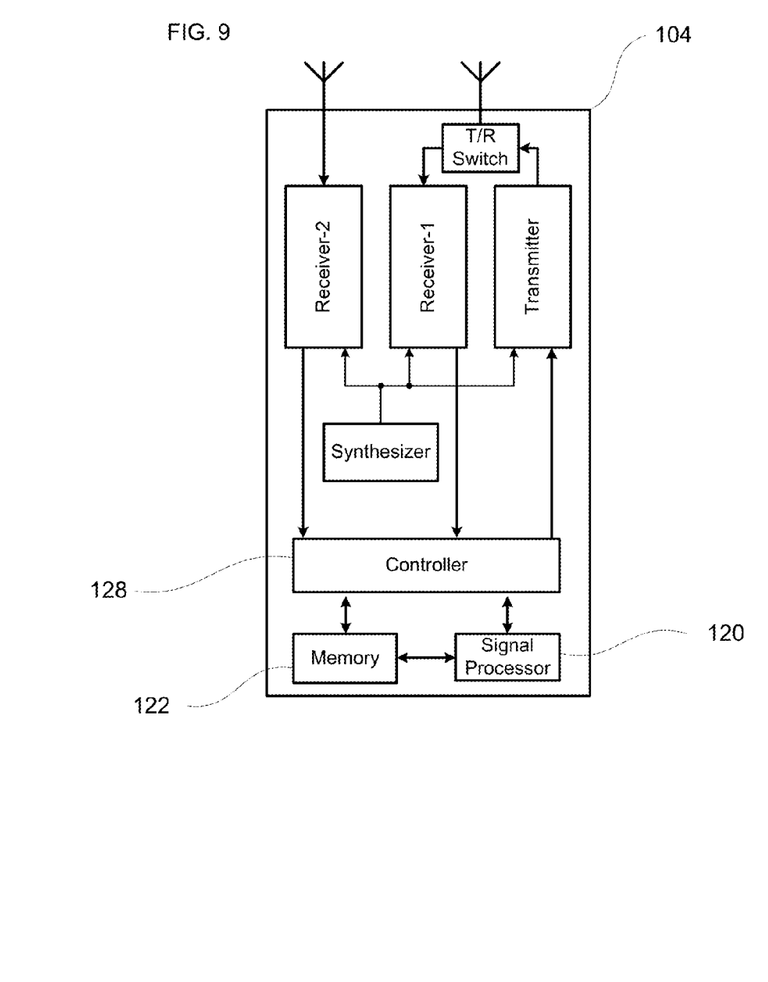
FIG. 9 illustrates an RF subsystem for a wireless mobile station, which may be employed with aspects of the invention described herein.

The application processor subsystem 101 as shown in FIG. 7 may include a controller 108 such as a microcontroller or other processor. The baseband subsystem 102 as shown in FIG. 8 may include a controller 118 such as a microcontroller or other processor. The RF subsystem 104 as shown in FIG. 9 may include a controller 128 such as a microcontroller or other processor. The controller 108 desirably handles overall operation of the MS 100. This may be done by software or firmware running on the controller 108. Such software/firmware may embody any methods in accordance with aspects of the present invention.

In FIG. 8 the peripherals 114 such as a full or partial keyboard, video or still image display, audio interface, etc may be employed and managed through the controller 108.

Aspects of the present invention may be implemented in firmware of the controller 108 of the application processor and/or the controller 118 of the baseband subsystem as shown in FIG. 6. In another alternative, aspects of the present invention may also be implemented as a combination of firmware and hardware of the application processor subsystem 101 and/or the baseband subsystem 102. For instance, signal processing functionality of any or all of the FIG. 8 may be implemented in firmware and/or software, which is executed by the system hardware. It may be part of the baseband subsystem, the receiver subsystem or be associated with both subsystems. In one example, the controller 118 and/or the signal processor 110 may include or control the protocol entity circuitry. The software may reside in internal or external memory and any data may be stored in such memory. The hardware may be an application specific integrated circuit ("ASIC"), field programmable gate array ("FPGA"), discrete logic components or any combination of such devices. The terms controller and processor are used interchangeably herein.

The consumer electronics devices that may use this invention may include smartphones, tablets, laptops, gaming consoles, cameras, video camcorders, TV, car entertainment systems, etc.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. Aspects of each embodiment may be employed in the other embodiments described herein.

The invention claimed is:

1. A method of employing radio signal information in a receiver used in a wireless communication system having multiple cells, the method comprising:
   initiating, by one or more processors of the receiver, a cell search procedure detecting new cells and tracking already detected cells from one or more previous cell search procedures;
   performing, by the one or more processors, Reference Signal Received Power (RSRP) measurements for a serving cell and neighbor cells detected during the cell search procedure;
   selecting for further processing, by the one or more processors, any of the neighbor cells whose RSRP is within a first predetermined dB difference ($\Delta_1$) of the serving cell;
   determining, by the one or more processors, whether one or more of the selected neighbor cells' Physical Cell Identity (PCI) is the same as any previously visited cell;
   for the selected neighbor cells whose PCI is the same as any respective previously visited cell, the one or more processors using a previously decoded and tracked Radio Frame Number (RFN) corresponding to the respective previously visited cell;
   performing, by the one or more processors, Physical Broadcast Channel (PBCH) decoding for any remaining selected neighbor cells whose RFN is not yet known;
   stopping, by the one or more processors, the PBCH decoding for given ones of the neighbor cells that fall within a second predetermined dB difference ($\Delta_2$) below the serving cell RSRP after the given neighbor cells were previously selected for PBCH decoding;
   storing and tracking, by the one or more processors, the RFN and PCI for any ones of the neighbor cells that satisfy the selection criteria and whose PBCH decoding is successful; and
   using, by the one or more processors, the RFN and PCI information for the stored and tracked neighbor cells when a handover is completed to a new serving cell, wherein the RFN and PCI information is used to immediately resume, if enabled, one or more of a Channel State Information (CSI) function, an Sounding Reference Signal (SRS) function, and a Semi-Persistent Scheduling (SPS) function in the new serving cell after the handover.

2. The method of claim 1, further comprising omitting the PBCH decoding for the selected neighbor cells whose PCI is the same as a respective one of the previously visited cells.

3. The method of claim 1, wherein the PBCH decoding for a target neighbor cell is initiated by the one or more processors while the receiver is still to the serving cell.

4. The method of claim 3, wherein the PBCH decoding is initiated according to the RSRP and according to Reference Signal Received Quality (RSRQ) metrics.

5. The method of claim 4, wherein the PBCH decoding of the remaining selected neighbor cells whose RFN is not yet known is triggered by the RSRP and RSRQ metrics satisfying one or more configurable criteria.

6. The method of claim 5, wherein the one or more configurable criteria are that the neighbor cell RSRP and RSRQ metrics are within a configurable threshold of the serving cell RSRP and RSRQ metrics.

7. The method of claim 1, wherein the difference $\Delta_1$ between the serving cell RSRP and the neighbor cell RSRP is configured to be less than $\Delta_2$, and a first time instant where criteria for triggering the PBCH decoding is met after a second time instant for reporting measurements to a base station.

8. The method of claim 1, wherein the PBCH decoding of the neighbor cells is performed concurrently with active data transfer with the serving cell.

9. The method of claim 1, wherein, when the one or more processors estimate when a next handover will occur, stopping the PBCH decoding on all of the neighbor cells for a configurable period of time.

10. The method of claim 1, wherein, when signal conditions improve for the serving cell after a first time instant, the PBCH decoding for the neighbor cells is stopped to reduce power consumption.

11. The method of claim 1, wherein stopping the PBCH decoding for any of the neighbor cells is triggered according to a difference between the serving cell RSRP and each corresponding neighbor cell's RSRP.

12. The method of claim 11, wherein the difference between the serving cell RSRP and each corresponding neighbor cell's RSRP is set to accommodate hysteresis, thereby preventing one or more starts or stops in PBCH due to fluctuations in RSRP or RSRQ under fading conditions.

13. The method of claim 1, wherein once the one or more processors of the receiver decode the RFN of a particular cell, one or more relative offsets between the service cell and the neighbor cells are maintained by the receiver for a configurable amount of time.

14. The method of claim 13, wherein the one or more relative offsets are maintained for multiple neighbor cells.

15. The method of claim 13, wherein the one or more offsets are relative to an internal time reference of the receiver not tied to any particular serving cell.

16. The method of claim 1, wherein, when the one or more processors of the receiver perform reselection or handover to a particular cell with previously detected PCI within a configurable time period $T_{revisit}$, then the PCI is considered to refer to the particular cell with the same Global Cell Identity (GCI).

17. The method of claim 16, wherein the configurable time period $T_{revisit}$ is dynamically adjusted based on one or more factors derived from a number of reselections or handovers in a certain period of time.

18. The method of claim 16, wherein a counter for the configurable time period $T_{revisit}$ is maintained separately for each neighbor cell.

19. A receiver device for use in a wireless communication apparatus, the receiver device comprising:
- means for receiving signals from multiple cells in a wireless communication system; and
- one or more processing devices operatively coupled to the receiving means, the one or more processing devices being configured to:
- initiate a cell search procedure detecting new cells and tracking already detected cells from one or more previous cell search procedures;
- perform Reference Signal Received Power (RSRP) measurements for a serving cell and neighbor cells detected during the cell search procedure;
- select, for further processing, any of the neighbor cells whose RSRP is within a first predetermined dB difference ($\Delta_1$) of the serving cell;
- determine whether one or more of the selected neighbor cells' Physical Cell Identity (PCI) is the same as any previously visited cell;
- for the selected neighbor cells whose PCI is the same as any respective previously visited cell, use a previously decoded and tracked Radio Frame Number (RFN) corresponding to the respective previously visited cell;
- perform Physical Broadcast Channel (PBCH) decoding for any remaining selected neighbor cells whose RFN is not yet known;
- stop the PBCH decoding for given ones of the neighbor cells that fall within a second predetermined dB difference ($\Delta_2$) below the serving cell RSRP after the given neighbor cells were previously selected for PBCH decoding;
- store and track the RFN and PCI for any ones of the neighbor cells that satisfy the selection criteria and whose PBCH decoding is successful; and
- use the RFN and PCI information for the stored and tracked neighbor cells when a handover is completed to a new serving cell, wherein the RFN and PCI information is used to immediately resume, if enabled, one or more of a Channel State Information (CSI) function, an Sounding Reference Signal (SRS) function, and a Semi-Persistent Scheduling (SPS) function in the new serving cell after the handover.

20. A non-transitory recording medium storing instructions thereon, the instructions, when executed by one or more processors, causing the one or more processors to execute a method of employing radio signal information in a receiver used in a wireless communication system having multiple cells, the method comprising:
- initiating a cell search procedure detecting new cells and tracking already detected cells from one or more previous cell search procedures;
- performing Reference Signal Received Power (RSRP) measurements for a serving cell and neighbor cells detected during the cell search procedure;
- selecting, for further processing, any of the neighbor cells whose RSRP is within a first predetermined dB difference ($\Delta_1$) of the serving cell;
- determining whether one or more of the selected neighbor cells' Physical Cell Identity (PCI) is the same as any previously visited cell;
- for the selected neighbor cells whose PCI is the same as any respective previously visited cell, using a previously decoded and tracked Radio Frame Number (RFN) corresponding to the respective previously visited cell;
- performing Physical Broadcast Channel (PBCH) decoding for any remaining selected neighbor cells whose RFN is not yet known;
- stopping the PBCH decoding for given ones of the neighbor cells that fall within a second predetermined dB difference ($\Delta_2$) below the serving cell RSRP after the given neighbor cells were previously selected for PBCH decoding;
- storing and tracking the RFN and PCI for any ones of the neighbor cells that satisfy the selection criteria and whose PBCH decoding is successful; and
- using the RFN and PCI information for the stored and tracked neighbor cells when a handover is completed to a new serving cell, wherein the RFN and PCI information is used to immediately resume, if enabled, one or more of a Channel State Information (CSI) function, an Sounding Reference Signal (SRS) function, and a Semi-Persistent Scheduling (SPS) function in the new serving cell after the handover.

* * * * *